L. B. Batcheller,
Making Barrel Heads,
Nº 27,682. Patented Apr. 3, 1860.
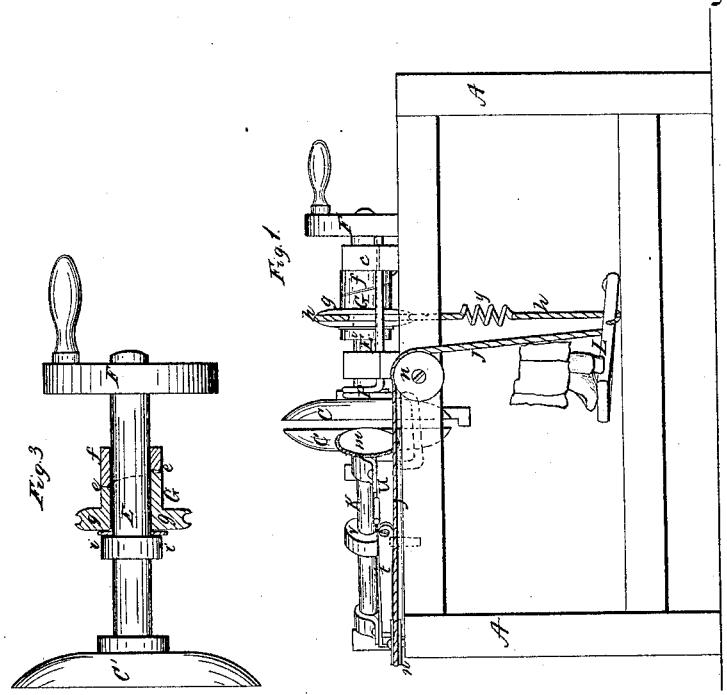
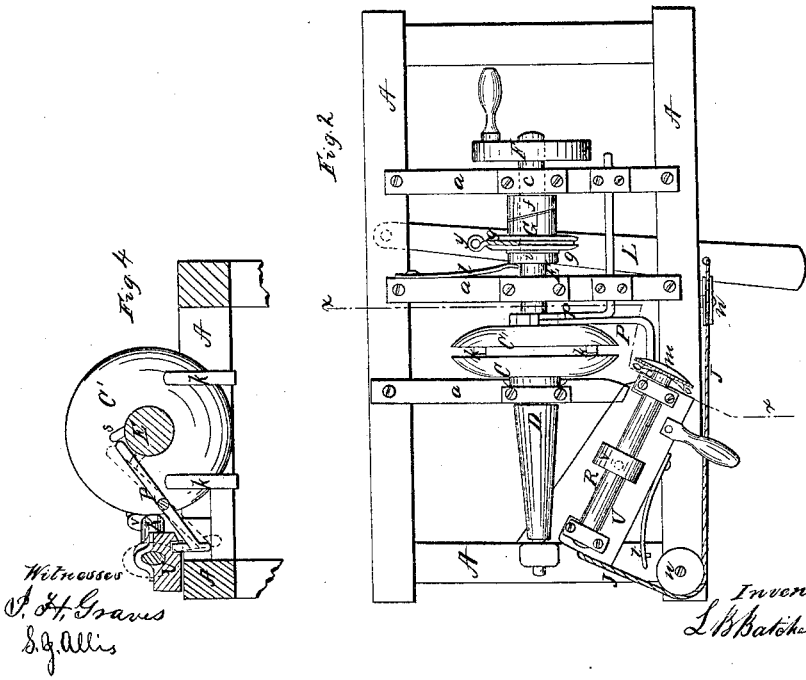
Witnesses
J. H. Graves
S. G. Allis
Inventor
L. B. Batcheller

UNITED STATES PATENT OFFICE.

L. B. BATCHELLER, OF ROCHESTER, NEW YORK.

MACHINE FOR MANUFACTURING BARREL-HEADS.

Specification of Letters Patent No. 27,682, dated April 3, 1860.

*To all whom it may concern:*

Be it known that I, L. B. BATCHELLER, of Rochester, in the county of Monroe and State of New York, have invented a new and Improved Machine for Cutting Out the Heads of Barrels and other Cooperage Work; and I do hereby declare that the following is a full and exact description thereof, reference being had to the accompanying drawings, making part of this specification, in which—

Figure 1, is a front elevation thereof, Fig. 2, a plan view of the top of the machine, Fig. 3, is an elevation of the clamping disk C, detached, the hollow cam shaft being shown in section, Fig. 4, is a transverse section of the upper part of the machine on the line $x$ $x$ of Fig. 2.

Similar letters designate corresponding parts in all the figures.

As shown in the drawings, A represents an ordinary rectangular frame of a convenient height for supporting the working parts of the machine. Transverse girts $a\,a\,a$ are provided to furnish bearings for the shaft D, to one end of which is attached the head disk C. Opposed to it but on an independent shaft E, the clamping disk C', is hung. At the opposite end of this shaft is affixed the driving pulley, F, to which the power is applied. The shaft E, passes through a hollow shaft G, which is divided obliquely across on the line $e$ into two parts, one of which $f$ is attached to the box $c$ and the other is provided with the pulley $g$ to which a cord $h$ or its equivalent is attached and extends down to the foot lever L. By depressing this lever the pulley $g$ turns the part of the shaft to which it is attached, which acting as a cam against the oblique surface of the stationary part, moves the shaft E, endwise, forcing the clamp C', against its stationary counterpart. In doing this it acts against the collar $i$ which is firmly fixed on the shaft, the part G, being loose thereon in order to allow of the free revolutions of the shaft.

The disk C', is provided with lugs or hooks $k$, $k$, Fig. 4, upon one side which sustain the staves of which the barrel head is formed, the pieces being laid one upon another in the space between the two disks until the required extent of material for the head is obtained. The foot is then placed on the lever L, and the staves are securely clamped between the two disks, and so held while the operation of cutting out the head is performed as follows:

The circular saw $m$ which is hung at the end of the oscillating shaft K, is brought in contact with the staves by the same act which tightens the clamps upon them, by means of the cord J, which connects the table U, bearing the arbor of the saw, with the foot lever L. The cord passes over pulleys $n$ $n$ to give it the proper direction and is so arranged, as to move the saw up to the cutting point simultaneously with the clamping of the staves, and the shaft E, being put in motion the staves are carried slowly around one revolution, the saw in the mean time cutting out the circular head, and giving the required bevel to the edge upon one side, while that on the other is produced by a series of small knife-cutters $o$ $o$ attached to the side of the saw. The saw is made concave or dishing to adapt it to the degree of bevel required for the circle of the head and prevents binding.

A pawl-lever P, of the form represented, falls with its hooked end $r$ into a hole on the underside of the saw frame or table, and holds it in a fixed position for cutting during a single revolution of the disks, but a projection $s$ is provided on the disk C, which by striking the long arm of the lever throws it out (as shown by dotted lines in Fig. 4), and the saw is immediately withdrawn by means of the spring $t$ acting on the table U. A spring $l$ acting against the collar $i$ throws back the shaft E, and releases the head which is then removed, and its place again filled with staves.

The application of the hooks $k$ $k$ to the heading disk C', accomplishes, in a very simple and perfect manner, a part of the operation which has heretofore required complicated mechanism, viz—the arranging and holding the supply of staves to form the head before they are secured and brought to the saw. The disk being always stopped at the point when these hooks are underneath, they sustain the staves as they are laid between the two disks, until they are secured by clamping, and offer no obstacle to the removal of the head when finished, as it drops by them the moment it is unclamped.

The saw $m$ is driven by a band from a shaft above running on the axial pulley $v$, which is placed precisely over the pivot which forms the center of motion of the table U. By this arrangement the table oscillates to move the saw the required distance without affecting the band on the pulley materially and entirely obviates the necessity of unbanding or using a guide pulley. The motion of the saw is not suspended or interrupted while its position is being changed.

A spring $y$ is provided for the cord $h$ to allow it to elongate slightly after clamping the heading, in order to permit the lever L, to act on the saw table to feed the saw through the thickness of the heading when the cut commences, after which the pawl holds it to its work. The pawl lever, in addition to its other offices serves to prevent the disks from turning backwards under the influence of the saw when it is entering the staves, and the projection $s$ by which this is accomplished, is curved to a circle of which the axis of the pawl is the center, to prevent the lever slipping off under the counter strain of the saw.

The rotation to feed the staves to the saw may be effected either by hand with a crank or by power, suitable mechanism being employed in the latter case to stop the motion at the required point.

What I claim as my invention and desire to secure by Letters Patent, is—

1. The combination and arrangement of the passive disk C, with the clamping disk C', hollow cam-shaft G, and foot lever L, together with the cord J, for actuating the saw table U, simultaneously with the clamping of the staves, and the pawl and lever P, operating conjointly substantially as and for the purposes set forth.

2. I further claim the application of the lugs or hooks $k$ $k$ to the clamping disk C', for the purpose of sustaining the staves while being supplied to the disks, substantially in the manner set forth.

L. B. BATCHELLER.

Witnesses:
I. H. GRAVES,
S. J. ALLIS.